US009156572B2

(12) United States Patent
Straub et al.

(10) Patent No.: US 9,156,572 B2
(45) Date of Patent: Oct. 13, 2015

(54) SEALING DEVICE AND METHOD FOR SEALING A CONTAINER BOWL WITH A HEAT SEALING FILM

(71) Applicant: Harro Höfliger Verpackungsmaschinen GmbH, Allmersbach im Tal (DE)

(72) Inventors: Klaus Straub, Backnang-Unterschöntal (DE); Udo Egelkraut, Weissach im Tal (DE)

(73) Assignee: Harro Höfliger Verpackungsmaschinen GmbH, Allmersbach im Tal (DE)

( * ) Notice: Subject to any disclaimer, the term of this patent is extended or adjusted under 35 U.S.C. 154(b) by 196 days.

(21) Appl. No.: 13/850,387

(22) Filed: Mar. 26, 2013

(65) Prior Publication Data

US 2013/0248107 A1   Sep. 26, 2013

(30) Foreign Application Priority Data

Mar. 26, 2012   (EP) ................................. 12002095

(51) Int. Cl.
*B65B 7/00*    (2006.01)
*B65B 25/00*   (2006.01)
(Continued)

(52) U.S. Cl.
CPC . *B65B 7/00* (2013.01); *B29C 65/18* (2013.01); *B29C 65/7841* (2013.01); *B29C 66/112* (2013.01); *B29C 66/131* (2013.01); *B29C 66/53461* (2013.01); *B29C 66/8161* (2013.01); *B29C 66/8167* (2013.01); *B29C 66/81463* (2013.01); *B29C 66/8242* (2013.01); *B29C 66/8322* (2013.01); *B29C 66/8432* (2013.01); *B29C 66/91212* (2013.01); *B29C 66/91231* (2013.01); *B29C 66/91421* (2013.01); *B29C 66/961* (2013.01); *B65B 7/16* (2013.01); *B65B 25/008* (2013.01); *B65B 51/14* (2013.01)

(58) Field of Classification Search
CPC ............................ B65B 25/008; B65B 31/021
USPC ................................................ 156/69; 53/477
See application file for complete search history.

(56) References Cited

U.S. PATENT DOCUMENTS

| | | | |
|---|---|---|---|
| 6,413,334 B1 * | 7/2002 | Rittner et al. | 156/64 |
| 2004/0112008 A1 * | 6/2004 | Voss et al. | 53/329.3 |
| 2010/0308492 A1 * | 12/2010 | Merbach et al. | 264/165 |

FOREIGN PATENT DOCUMENTS

| | | |
|---|---|---|
| EP | 1 013 548 B1 | 6/2000 |
| EP | 1 545 977 B1 | 6/2005 |
| JP | 9-169320 A | 6/1997 |

*Primary Examiner* — Carson Gross
(74) *Attorney, Agent, or Firm* — Gudrun E. Huckett

(57) ABSTRACT

A sealing device for sealing container bowls with a heat sealing film has several sealing heads each correlated with one container receptacle. The sealing heads are movable in a sealing stroke direction relative to the container receptacles that are connected fixedly to each other. The sealing heads are forced with pretension into a rest position by spring elements in the sealing stroke direction against a stop, each sealing head having one stop associated therewith. For simultaneous sealing of the heat sealing film onto the several container bowls, a spring support, on which the spring elements are jointly secured, is moved together with the sealing heads so far in the sealing stroke direction relative to the container receptacles that the sealing heads upon impacting on the container receptacles correlated therewith, with interposition of the container bowls and the heat sealing film, are lifted off their stops against the pretension.

19 Claims, 5 Drawing Sheets

(51) Int. Cl.
*B65B 51/14* (2006.01)
*B65B 7/16* (2006.01)
*B29C 65/18* (2006.01)
*B29C 65/78* (2006.01)
*B29C 65/00* (2006.01)

SEALING DEVICE AND METHOD FOR SEALING A CONTAINER BOWL WITH A HEAT SEALING FILM

BACKGROUND OF THE INVENTION

The invention concerns a sealing device for sealing container bowls with a heat sealing film, the sealing device comprising several container receptacles for simultaneous receiving of several container bowls as well as several sealing heads associated each with a container receptacle, wherein the several sealing heads for simultaneous sealing of the heat sealing film onto the several container bowls are movable in a sealing stroke direction relative to the container receptacles, wherein the several container receptacles are fixedly connected to each other and in particular combined in a common receiving block, and wherein the several sealing heads in a rest position are forced with pretension by means of a spring element, respectively, in the sealing stroke direction against a stop, each sealing head having one stop associated therewith. The invention further relates to an associated method for sealing such container bowls with a heat sealing film.

In various application situations, products are stored in sealed containers. According to the prior art, the corresponding packaging process is realized in that individual container bowls are provided and filled with the respective product. Several such individual and filled container bowls are then subsequently and simultaneously sealed with a continuous heat sealing film so that a continuous strip of containers is produced. Only at a later point in time the container strips are individualized to individual sealed containers. In the known embodiments, the several container bowls are arranged in the form of a matrix. With application of pressure and temperature, a common sealing head that covers the entire matrix is then lowered, with intermediate positioning of the heat sealing film, onto the filled container bowls that are received in container receptacles. A problem in this context is that the individual container bowls have thickness tolerances and position tolerances which cannot be compensated by the sealing head that is jointly acting onto the several container bowls. As a result, there is the risk that individual container bowls and the heat sealing film resting thereon are not subjected to a uniform and satisfactory sealing pressure or that individual container rims that are too thick are excessively melted under pressure that is too high and are thereby deformed too much. The sealing action can therefore be defective and can lead to undesirable rejects.

EP 1 545 977 B1 and EP 1 013 548 B1 are dealing with the aforementioned problem, wherein in various embodiments the same basic principle of tolerance compensation is employed. The individual container bowls that are to be sealed simultaneously are held individualized in their own correlated container receptacles wherein these individual container receptacles are moveable independently of each other and relative to each other in a yielding fashion. A plunger with a large sealing head that covers several container bottom parts or even individual plungers with a single sealing head each associated with a single container bottom part are then moved, in particular pneumatically, against the container bottom parts so that a sealing process takes place. The pneumatic pressure for movement is controlled so that, in connection with the individual yielding suspension of the individual container bottom parts, a uniform sealing pressure with tolerance compensation is supposed to be realized.

A problem here is the high expenditure for the device and the control circuit. The individual suspension of the container bottom part is complex and cost-intensive wherein an exact adjustment of the controlled contact pressure is required.

The invention has the object to further develop a sealing device of the aforementioned kind in such a way that with simplified construction and increased processing reliability a reliable sealing action with tolerance compensation can be performed.

SUMMARY OF THE INVENTION

This object is solved for the sealing device in that the spring elements are secured on a common spring support and in that a travel stroke of the common spring support with a sealing stroke in the sealing stroke direction is provided with such a value that upon impacting of the sealing heads on the container receptacles correlated therewith, with interposition of the container bowls and the heat sealing film, the sealing heads are lifted off their stops against the acting pretension.

The invention has furthermore the object to provide a simplified sealing method with increased processing reliability and reliable tolerance compensation.

This object is solved by a method with the following method steps:
several container receptacles fixedly connected to each other receive simultaneously several container bowls;
several individual sealing heads each correlated with one container receptacle are forced with pretension in a rest position by means of a spring element, respectively, in a sealing stroke direction against a stop, each sealing head having one stop associated therewith:
for the simultaneous sealing action of the heat sealing film onto the several container bowls, a common spring support, on which the spring elements are jointly secured, is moved, together with the spring elements and the sealing heads, in the sealing stroke direction relative to the container receptacles to such an extent that the sealing heads upon impacting on the container receptacles correlated therewith, with interposition of the container bowls and the heat sealing film, are lifted off their stops against the pretension acting on them.

According to the invention, it is provided that the several container receptacles are connected fixedly to each other and in particular are combined to a common receiving block. In a rest position, each of the several individual sealing heads is forced with pretension against a stop, each sealing head having one stop associated therewith, by means of a passive spring element in the sealing stroke direction. The spring elements are secured on a common spring support. A travel stroke of the spring support with a sealing stroke in the sealing stroke direction is provided to have such a value that upon impacting of the sealing heads on the container receptacles correlated therewith, respectively, with interposition of the container bowls and the heat sealing film, the sealing heads are lifted off their stops against the acting pretension, i.e., opposite to the sealing stroke direction.

In the associated method according to the invention, several fixedly connected container receptacles that are in particular combined to a common receiving block accommodate simultaneously several container bowls. In a rest position, several individual sealing heads that are each correlated with one container receptacle are forced with pretension by means of a passive spring element, respectively, in the sealing stroke direction against a stop, each sealing head having one stop associated therewith. For simultaneous sealing of the heat sealing film onto the several container bowls, the spring support on which the spring elements are jointly secured is moved, together with the spring elements and the sealing heads, in the sealing stroke direction relative to the container receptacles to such an extent that the sealing heads upon impacting on the respectively correlated container receptacles, with interposition of the container bowls and the heat sealing film, are lifted off the stops against the pretension acting on them.

Spring elements in the context of the invention are no elastically yielding drives for generating drivingly a travel stroke but are to be understood as spring elements that under the action of an external force, namely the action of the sealing pressure that is being generated are passively, i.e., without a drive action, subjected to an elastic deflection stroke without this including an active travel stroke that is driven by the spring element. The spring elements are moved by means of the spring support in the sealing stroke direction and passively entrained without however themselves contributing to the sealing stroke with an active driving action.

The sealing device according to the invention and the correlated method according to the invention enable firstly the use of constructively simply designed container receptacles that in particular are combined to a common receiving block. In deviation from the prior art, no relative yielding action of the individual container receptacles relative to each other or relative to the machine as a whole is required. Instead, it is sufficient and it is also provided in this way that they are connected fixedly with each other without in this connection a yielding action playing a role on a technically relevant scale. Position and thickness tolerances of the simultaneously inserted container bowls are deliberately accepted and are compensated at a different location, namely by means of the individual sealing heads. Namely, the interaction of the spring elements, of the individual sealing heads secured thereat, the spring support, and its adjusted sealing stroke is provided for the compensation of the aforementioned tolerances.

In a starting position before beginning the sealing process, the passive spring elements have the effect that all of the sealing heads are resting with pretension at their stops and in this way assume an exactly defined position. The entire unit is then moved such that the sealing heads, with interposition of the sealing film and the sealing rim of the container bowls, impact the fixed container receptacles. Since the position tolerances and thickness tolerances are to be expected here, this impact takes place earlier for individual containers than for others. However, at this point the relative travel stroke is not stopped but is continued until the predetermined sealing stroke is reached. The sealing stroke is dimensioned such that all individual sealing heads are lifted off their stops against the pretension of the individual spring elements by the successively generated contact pressure of the container bowls. Since the spring elements are passive, i.e., are not themselves driven, they are counteracting this lifting movement only with their fixedly predetermined or fixedly adjusted spring pretension which, in the lifted state, is acting no longer onto the stops but entirely on the sealing surface and generates thereat a defined sealing contact pressure. Since this contact pressure is defined exclusively by the pretension of the respective spring element, it is, with respect to a technically relevant scale, independent of the aforementioned position tolerances and thickness tolerances of the container bottom parts and is also adjusted to the desired value for each individual container or for each individual container bottom part, including the corresponding heat sealing film, separately and independently from each other. With minimal technical expenditure, with high process reliability and effective tolerance compensation, a reliable sealing of the individual containers can be performed.

In a preferred further embodiment of the invention, the individual sealing head is connected to the spring element correlated with it so as to be tiltable about at least one axis, preferably several axes, positioned perpendicularly to the sealing stroke direction. In this way, it is achieved that the individual sealing head is not only capable of yielding opposite to the sealing stroke direction but also by means of an appropriate tilting movement can compensate tilted positions and comparable positional tolerances of the container bowls. For this purpose, between an individual sealing head and the spring element correlated with it, a pressure rod is expediently provided that is connected with articulation to the sealing head and also with articulation with the spring element. This enables a tolerance compensation in almost all spatial degrees of freedom.

In an advantageous embodiment, for forming the stop for an individual sealing head a total of three contact points are provided. Expediently, for this purpose the first contact point is formed by two planar surfaces that meet each other, the second contact point is formed by a roof-shaped notch and a corresponding counter member, and the third contact point by a recess, in particular a conical recess, with a circumferentially extending rim and a corresponding counter member. The precisely three contact points generate in the contacting state a geometrically precisely defined positioning of the sealing head without over-determination. The interaction of the planar surfaces, of the roof-shaped notch and the counter member, and of the aforementioned recess and the corresponding counter member provide for an exact spatial positioning in all degrees of freedom of movement. The sealing head which is positioned in this way is therefore advanced with greatest possible precision to the container bowls to be sealed.

Spiral springs, elastomer springs or the like are considered for the configuration of the spring elements. In a preferred embodiment, the spring element is formed by a gas pressure spring, in particular in the form of a pneumatic cylinder, wherein the pneumatic cylinder during the sealing process is loaded with a predetermined pressure difference. In an optionally uncontrolled embodiment, a predetermined pressure difference is applied that, as a result of the very small lifting stroke causing the tolerance compensation, practically does not change or changes technically negligibly only to such an extent that this has no effect on the sealing quality. In addition, it may be expedient that the pneumatic cylinder for maintaining the predetermined pressure difference is connected to a pressure storage. The volume of the pneumatic cylinder or cylinders adds to the volume of the pressure storage. In this way, a volume enlargement is generated which further decreases the already small pressure fluctuations caused by the minimal lifting stroke or reduces them to a technically negligible amount. In one embodiment with pressure control in which the pneumatic cylinder is provided or connected with a pressure control valve, an even more precise adjustment and constant maintaining of the cylinder pressure or of the acting pressure difference and thus of the sealing pressure can be realized. In this connection, it can also be expedient to combine pressure storage and pressure control with each other. In any case, an exact adaptation of the pretensioning force, and thus of the future sealing pressure, is enabled with respect to the respectively planned sealing task. With simple means it can be ensured that all of the pressure springs that are being used have the same pretensioning force and thus the same sealing pressure. For all containers that are sealed within a joint sealing process, almost exactly the same and reproducible sealing conditions are provided.

In an advantageous variant, the aforementioned pneumatic cylinder can be controlled, apart from the sealing process, as a lifting cylinder. Inasmuch as in an individual situation no sealing operation is planned, the aforementioned pneumatic cylinder is no longer used as a passive spring element, but is converted to an active lifting cylinder. Individual ones or all of the sealing heads can be actively lifted and thus be deactivated, for example, for maintenance purposes and in particular for preventing sealing of defective parts (for example, unfilled container bowls). Inasmuch as then the usual sealing process is to be performed again, the retracted sealing heads can be likewise moved against their stops with the pneumatic cylinder converted to a lifting cylinder. As soon as this has happened and the pneumatic cylinder has been loaded with the desired pressure, the pneumatic cylinder is separated from its control and then again assumes its function as a passive gas pressure spring.

It may be expedient to position the spring support together with the spring elements spatially stationarily in the sealing device wherein then the container receptacles that are connected fixedly to each other or the corresponding receiving block must be lifted from below against the sealing heads for the sealing process. In a preferred embodiment, a baseplate is provided that is secured stationarily within the sealing device on which the container receptacles that are connected fixedly to each other and in particular the receiving block are positioned stationarily during the sealing process. The spring support is positioned above the baseplate wherein the spring support with the several spring elements secured thereat and the corresponding sealing heads is moveable in the sealing stroke direction from an upper starting position in downward direction toward the baseplate and toward the container receptacles. This enables a simple manipulation in particular of the container receptacles or the receiving block because they can be moved, without paying attention to stroke travel, on the baseplate in a cycled fashion into their sealing position and, after completion of the sealing process, can be transferred to further processing.

In a preferred embodiment, the spring support that is arranged above the baseplate, a bottom carrier arranged below the baseplate, and at least two columns together form a closed frame that can be lowered from the upper starting position relative to the baseplate with the container receptacles in the sealing stroke direction by means of a suitable drive in downward direction. Because of the frame-like configuration, a stiff construction results that can be moved with the desired precision reproducibly and without positional deviations between the upper starting position and the lower sealing position. Expediently, between the bottom carrier and the baseplate an adjusting element, in particular in the form of a pneumatic cylinder, is arranged by means of which the closed frame can be lowered in the sealing stroke direction and lifted in the opposite direction. By arrangement of the pneumatic cylinder below the baseplate and by its action on the lower bottom carrier, a space-saving and in particular very stiff configuration is provided in which the drive that generates the sealing stroke is arranged out of the way and without disruptive spatial interaction with the actual sealing process. The high stiffness of the construction avoids unwanted alignment tolerances and enhances the precision during the sealing process.

In a preferred embodiment, the sealing head comprises a base member as well as a sealing plate attached to the base member so as to be releasable and exchangeable. On the base member that is comprised of a single part or several parts a heating jacket and a temperature sensor are arranged. The sealing plate which is facing the respective container bowl effects with its sealing surface the actual sealing process wherein by means of the heating jacket and the temperature sensor a precise control and in particular a precise regulation of the sealing temperature required for the sealing process can be carried out. Since the sealing jacket and the temperature sensor are mounted on the base member and not on the sealing plate, they remain on the base member even when the sealing plate is demounted or exchanged. The sealing plate itself has only in the mounted state a heat-transmitting contact to the temperature sensor and, indirectly by means of the base member, to the heating jacket without however itself being connected fixedly to a heating element or a temperature sensor. A wear-related exchange, for example, concerns only the sealing plate itself but not the temperature sensor or the heating jacket so that the sealing plate as a wear part can be designed simply and expensively.

BRIEF DESCRIPTION OF THE DRAWINGS

One embodiment of the invention will be explained in the following with the aid of the drawing in more detail.

DESCRIPTION OF PREFERRED EMBODIMENTS

Figure 1:
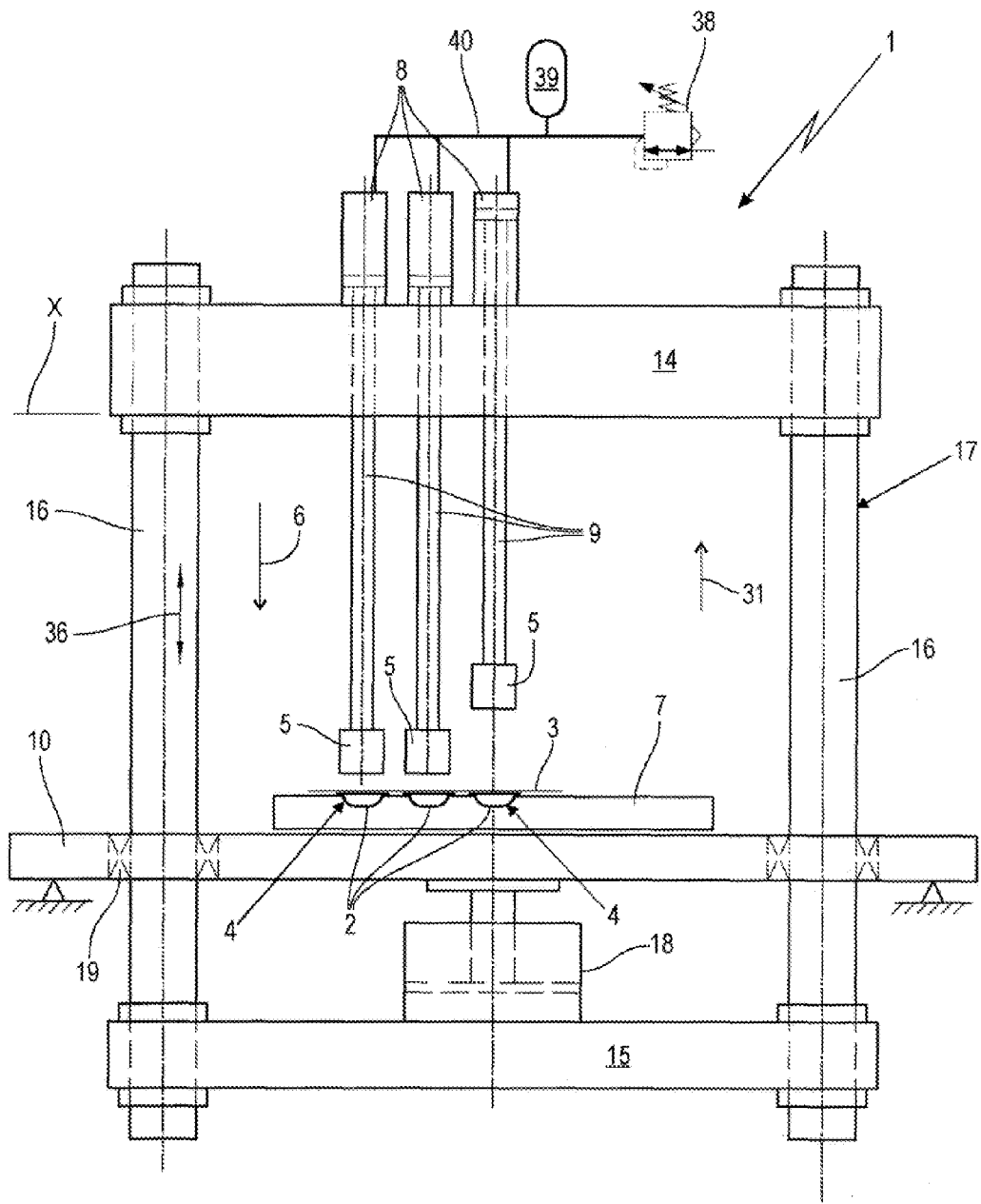
FIG. 1 shows in a schematic overview representation the principal configuration of the sealing device according to the invention with a stationarily secured baseplate and a frame that can be lowered relative thereto, wherein individual sealing heads with individual spring elements correlated therewith are secured on the spring support of the frame.

FIG. 1 shows in a schematic functional illustration as an example the principal configuration and the function of the sealing device 1 according to the invention and of the associated sealing method according to the invention. The sealing device 1 and the associated method are provided for sealing the individual container bowls 2 with a continuous heat sealing film 3 covering several container bowls 2. The sealing device 1 comprises several container receptacles 4 for simultaneously receiving several container bowls 2. In this context, several container receptacles 4 are connected fixedly to each other so that they do not allow relative movement relative to each other on a technically relevant scale. This can be achieved in that individual container receptacles 4 are embodied as individual parts and, for example, are screw-connected, clamped or in other ways fixedly connected to each other. In the illustrated embodiment, a continuous substantially rigid receiving block 7 is provided in which the several container receptacles 4 are integrally formed so that several container receptacles 4 together are combined in the receiving block 7. For the future sealing process, the combined container receptacles 4 receive at the same time several container bowls 2 in the sense that the container bowls 2 each are placed into one of the container receptacles 4, respectively.

In its operating position, the illustrated sealing device 1 is upright relative to the weight force direction such that the individual container bowls 2 are open in upward direction and are filled with an appropriate product from the top. In the illustrated embodiment, ophthalmic lenses, in particular contact lenses with appropriate storage liquid, are filled here into the individual container receptacles 4. Of course, in the context of the invention also other products can be filled in and packaged.

Each individual container receptacles 4 and thus each individual container bowl 2 contained therein has correlated therewith an individual sealing head 5 wherein in this connection for simplifying the drawing only three container receptacles 4 with three container bowls 2 contained therein and three correlated sealing heads 5 are illustrated as an example. In the actually preferred embodiment, in accordance with the embodiment according to FIG. 3 to be described infra in more detail, a total of two rows of six container receptacles 4 each and six sealing heads 5 each for simultaneous sealing of the corresponding number of container bowls 2 are provided. Of course, also a deviating number and/or a deviating matrix-like distribution of the container receptacles 4 and sealing heads 5 may be provided.

For simultaneous sealing of the continuous heat sealing film 3 onto several container bowls 2, the several sealing heads 5 are movable in a sealing stroke direction 6 relative to the container receptacles 4. For this purpose, the sealing heads 5 are lowered from above in the sealing stroke direction 6 downwardly onto the container receptacles 4 with intermediate positioning of the heat sealing film 3 and the sealing rims of the container bowls 2 so that by means of contact of the sealing heads 5 a sealing pressure is generated between the heat sealing film 3 and the sealing rim of the container bowls 2. With the action of this sealing pressure and of temperature the heat sealing film 3 is thus sealed onto the sealing rim of the container bowls 2. Two of the sealing heads 5 that are illustrated in FIG. 1 are positioned for this purpose in their lower operating position for the sealing process while the third one, in the illustration according to FIG. 1 the right sealing head 5, is lifted relative thereto in the direction of arrow 31 and thus is deactivated, for example, for maintenance purposes and in particular for the deliberate cessation of sealing of defective parts (for example, unfilled container bowls), Details in this context will be described infra.

Each one of the individual sealing heads 5 is attached to a passive spring element 8, respectively, that is arranged above; for this purpose, in the illustrated embodiment one pressure rod 9 is optionally arranged, respectively, between one sealing head 5 each and one spring element 8 each. The spring elements 8 are connected by pressure lines 40 with a common pressure storage 39 and a common pressure control valve 38. In this connection, details will also be explained infra. Moreover, a spring support 14 is provided on which all spring elements 8 are attached. The spring support 14 is actively drivable and therefore, for the sealing process, movable in downward direction from its illustrated starting position X together with the passive spring elements 8 and the sealing heads 5 attached thereto in the sealing stroke direction 6 in weight force direction.

In the illustrated embodiment, for this purpose, a baseplate 10 stationarily secured within the sealing device 1 is provided on which the container receptacles 4, fixedly connected to each other, and in particular the herein illustrated receiving block 7 with the container receptacles 4 integrated therein is stationarily positioned during the sealing process. The spring support 14 is positioned herein above the baseplate 10 and, together with the spring elements 8 secured thereto and the correlated sealing heads 5, is moved from the illustrated upper starting position X downwardly to the baseplate 10 and to the container receptacles 4 in the sealing stroke direction 6. Primarily, only the relative movement between the spring support 14 and the container receptacles 4 is important. Also, in the context of the invention it may be expedient to position the spring support 14 stationarily and to lift instead the container receptacles 4 or the baseplate 10 for the sealing process.

Below the baseplate 10 there is also a bottom carrier 15 so that the baseplate 10 is positioned between the spring support 14 and the bottom carrier 15. The spring support 14 and the bottom carrier 15 are connected to each other by means of at least two columns 16 so that they form together a rigid frame 17 which is movable as a unit together with the spring elements 8 and the sealing heads 5 in accordance with double arrow 36 relative to the stationary baseplate 10. For this purpose, in the baseplate 10 ball linings 19 are arranged through which the columns 16 extend vertically. The ball linings 19 or alternatively comparable linear sliding bearings permit, on the one hand, the aforementioned lifting movement of the frame 17 relative to the baseplate 10 and, on the other hand, provide a very stiff and thus very precise guiding action. For the active drive action of the aforementioned lifting movement between the bottom carrier 15 and the baseplate 10, an actuator is arranged in the illustrated embodiment and is a pneumatic cylinder 18 in the illustrated embodiment, by means of which the closed frame 17 can be lowered from the illustrated starting position X in the sealing stroke direction 6 and also can be lifted in the opposite direction.

Figure 2:
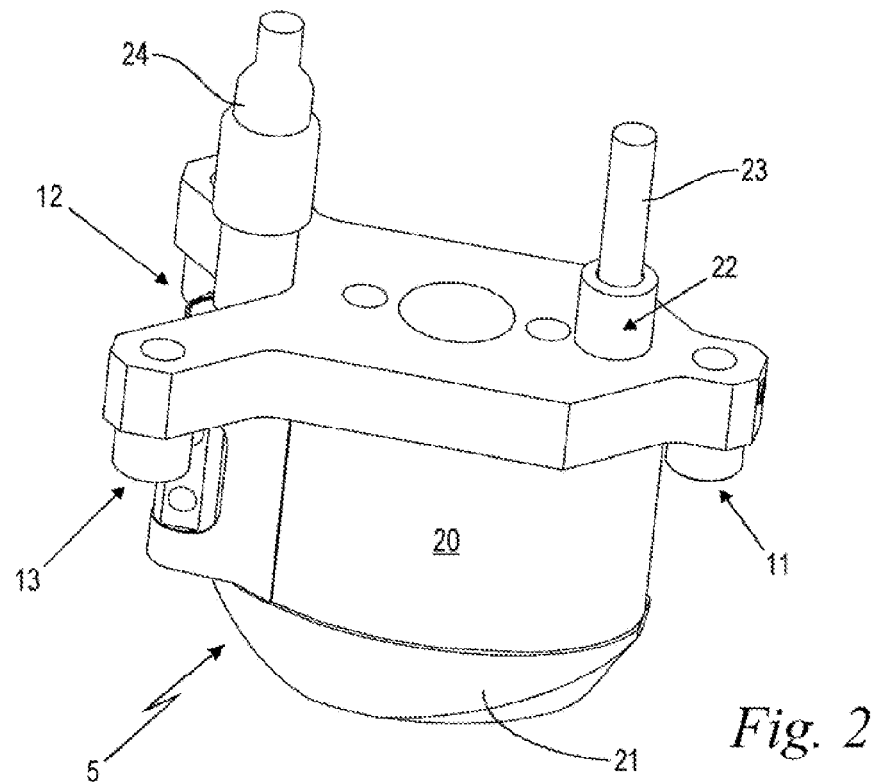
FIG. 2 shows in a perspective view an individual sealing head with exchangeable sealing plate and with three projections for forming three contact points.

FIG. 2 shows in a perspective view an individual sealing head 5 according to FIG. 1 in a concrete constructive embodiment. The sealing head 5 comprises a base member 20 as well as at its bottom side that is facing in the mounted position a container bowl 2 (FIG. 1) a sealing plate 21 attached releasably and exchangeably to the base member 20. On the bottom side of the sealing plate 21 that is opposite the base member 20 a sealing surface is formed which is pressed onto the heat sealing film 3 (FIG. 1) for sealing. The base member 20 is provided with a total of three radially projecting arms that each form a contact point 11, 12, 13 that will be described in more detail infra. A temperature sensor 22 with connecting line 23 is inserted from top to bottom into the base member 20. Also, in upward direction an electrical heating connector 24 is extending out and away from the base member 20. Further details thereof will be explained infra in connection with FIG. 5 in more detail.

Figure 3:
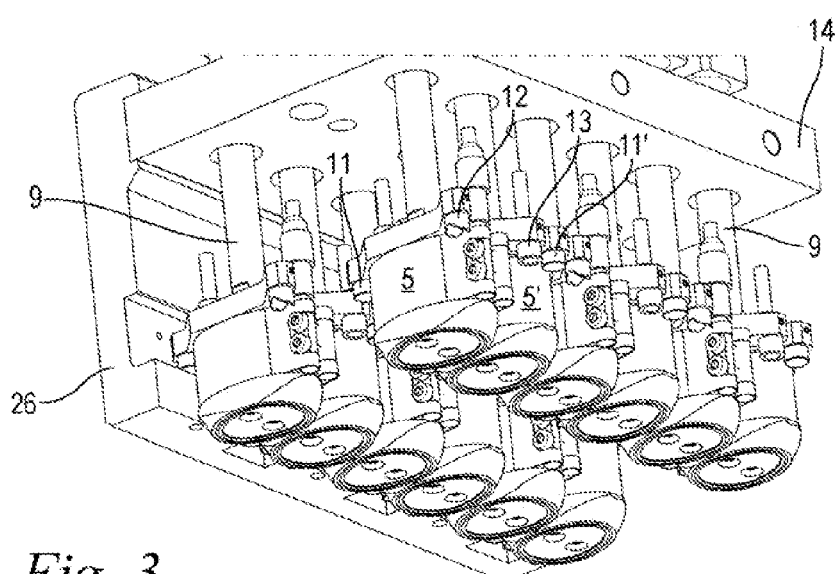
FIG. 3 shows in a perspective bottom view a concrete embodiment of the spring support according to FIG. 1 with several sealing heads according to FIG. 2 arranged thereat.

FIG. 3 shows in a perspective bottom view a concrete constructed section of the spring support 14 according to FIG. 1 that has, on its top side, two rows of six spring elements 8 each attached thereto, not illustrated here. The correlated pressure rods 9 extend through bores in the spring support 14 and support each a sealing head 5 according to FIG. 2. On a longitudinal edge of the spring support 14 a securing plate 26 is attached. Between the two rows of sealing heads 5 and on the oppositely position longitudinal edge of the spring support 14 there are further securing plates 27, 28 which in are not illustrated FIG. 3 for simplifying the illustration but can be seen in FIG. 4. The securing plates 26, 27, 28 are provided with appropriate counter members for forming the contact points 11, 12, 13. In detail, it can be seen that the first contact point 11 of an individual sealing head 5 is formed by two planar surfaces that are meeting each other, the second contact point 12 is formed by a roof-shaped notch and a counter member, not illustrated in detail, and the third contact point 13 is provided by a recess, here a conical recess, provided with a circumferentially extending rim and a counter member, also not shown in detail. Also, FIG. 3 shows that two neighboring sealing heads 5, 5' are installed so as to be alternatingly turned relative to each other by 180 degrees so that the second and third contact points 12, 13 of a sealing head 5 are positioned adjacent to the first contact point 11' of the neighboring sealing head 5'.

A stop is formed by the contact points 11, 12, 13 on the spring support 14 or its securing plates 26, 27, 28 (FIG. 4) for the several sealing heads 5, 5' against which the several sealing heads 5, 5' are forced with pretension in a rest position by means of the correlated passive spring elements 8.

Figure 4:
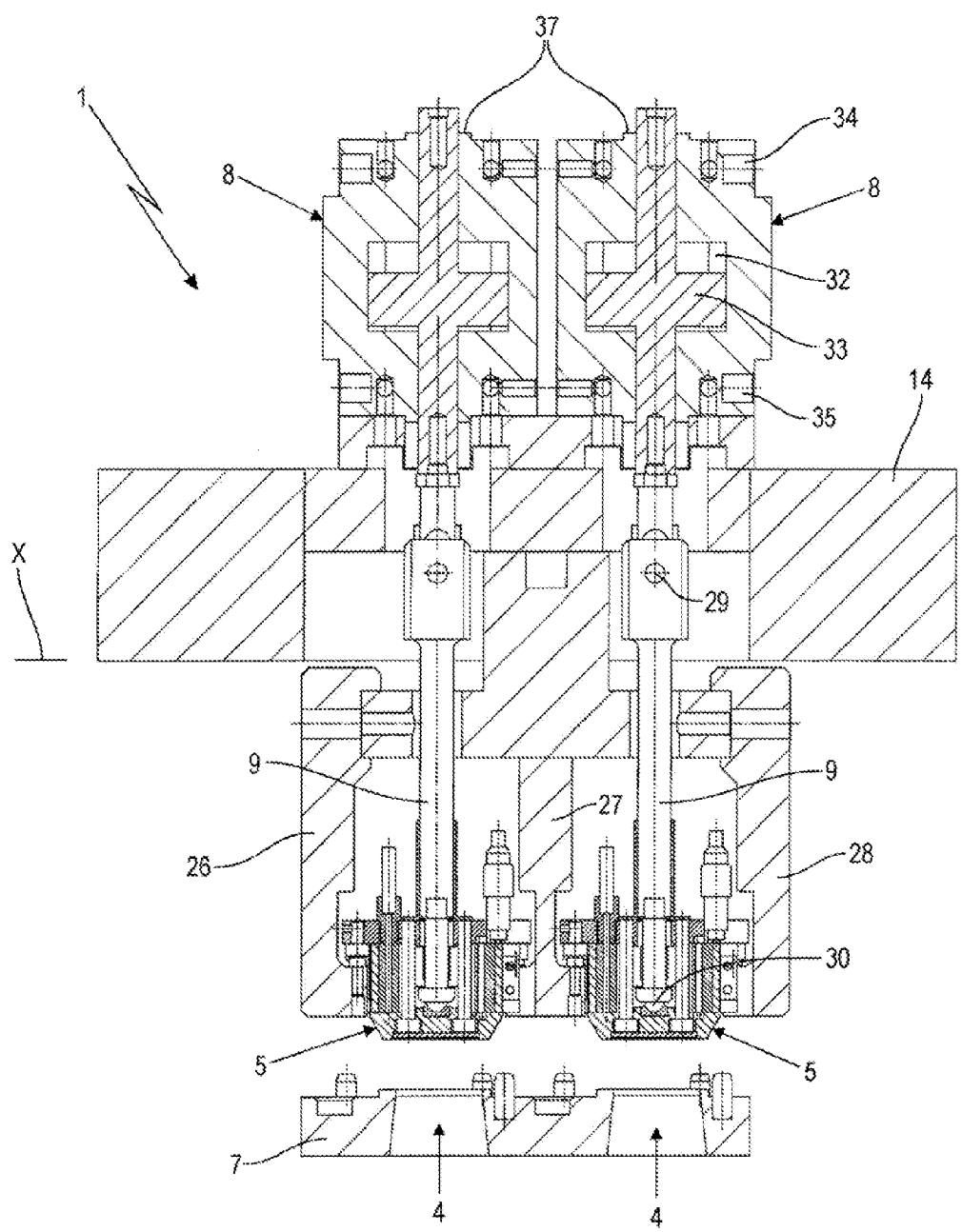
FIG. 4 is a section illustration of a concrete embodiment of the sealing device illustrated schematically in FIG. 1 in its starting position in which the individual sealing heads are resting under pretension against their stops without being in contact with the containers to be sealed.

FIG. 4 shows in longitudinal section illustration a concrete constructed sealing device 1 according to the functional principle in accordance with the illustration of FIG. 1. The spring support 14 is shown in accordance with FIG. 1 together with the spring elements 8 and the sealing heads 5 in an upper starting position X wherein between the sealing heads 5 and the receiving block 7 with the container receptacles 4 a vertical spacing remains. In the illustrated starting position X, the container receptacles 4 or the receiving block 7 with the several container bowls 2 (FIG. 1) contained therein simultaneously can be positioned precisely aligned below the sealing heads 5 in preparation for the future sealing process.

FIG. 4 shows also that the passive spring elements 8 each are embodied as a gas pressure spring, more precisely as a pneumatic cylinder 37 with an inner cylinder 32 and a piston 33 which is slidably arranged therein in vertical direction. The individual sealing heads 5 are connected for force transmission by means of the pressure rods 9 correlated with them to the respective piston 33. In this context, a connection of the pressure rod 9 with the piston 33 is provided by means of an upper articulation 29 and by means of lower articulation 30 with the sealing head 5. The articulations are of a multi-axis configuration for which purpose at the lower articulation 30 a ball joint is provided.

The pneumatic cylinders 37 are provided with pressure connectors 34, 35 by means of which the respective cylinder 32 can be loaded above and also below the piston 33 with a certain gas pressure or air pressure. A control unit, not illustrated, is designed such that the pneumatic cylinder 37, as needed, can be controlled alternatingly as a passive non-driven gas pressure spring or can be employed optionally, when preventing the sealing process, as an actively driven lifting cylinder. For the sealing operation and in preparation for the future sealing process, a defined preset pressure difference is adjusted at the piston 33. For this purpose, the lower pressure connectors 35 acting on the respective bottom side of the pistons 33 are switched to allow passage so that ambient pressure is applied. By means of the upper pressure connectors 34 that are acting at the respective topside of the pistons 33 a predetermined overpressure is introduced into the respective cylinder 32 so that the pneumatic cylinder 37 is loaded with a predetermined pressure difference at both ends of the piston 33 during the sealing process.

In the illustrated preferred embodiment, which is apparent when looking at both FIGS. 1 and 4, for this purpose the pneumatic cylinders 37 are connected with each other by means of the upper pressure connectors 34 and the pressure lines 40 connected thereto, with a common pressure storage 39, and with a common pressure control valve 38. By means of the pressure control valve 38, the overpressure acting in the cylinders 32 and, in combination with the ambient pressure at the bottom side of the pistons 33, the pressure difference that is acting on or resulting at the two ends of the pistons 33 are controlled to a constant level. The aforementioned pressure difference is identical for all pistons 33 because they are loaded at their bottom side with the same ambient pressure and because they are in pressure communication at their topside in the cylinders 32 by means of pressure lines 40 with each other and with the common pressure control valve 38.

However, in the context of the invention, it may also be expedient that each individual cylinder 32 is provided with its own pressure control valve 38 and/or its own pressure storage 39.

The pressure storage 39 arranged between the pressure control valve 38 and the cylinders 32 acts as a compensation volume for reducing pressure fluctuations or fluctuations of the pressure difference which may result from the lifting stroke δ that will be discussed in connection with FIG. 6 infra. The pressure storage 39 and the pressure control valve 38 are advantageous options wherein it is also possible to eliminate one or both of them, depending on the individual situation. Independent of the absence or the presence of a pressure control action and/or of pressure storage 39, no active drive of the pistons 33 is however existing. Instead, the unit of piston 33 and cylinder 32 acts as a passive gas pressure spring. The previously adjusted pressure difference forces the piston 33 vertically in downward direction. This pressure is transmitted by the respective piston 33 by means of the pressure rod 9 onto the respective sealing head 5 so that the latter in the starting position X is pushed downwardly in the sealing stroke direction 6 against the afore described stop and is thereat secured passively or without drive action. The length of the pressure rod 9 is matched such to the position of the aforementioned stops that the piston 33 itself will not hit a stop within the cylinder 32 and in this way cannot apply its pretension onto the sealing head 5. In the above described state of the starting position X illustrated in FIG. 4, the sealing device 1 is readied for the future sealing process.

Inasmuch as for certain purposes, for example, in case of detection of supply of defective parts or the like, a future sealing action is to be prevented, the pneumatic cylinder 37, by means of the aforementioned control device, can also be converted to, or controlled and employed as, a lifting cylinder for the respective sealing head 5 correlated therewith. For this purpose, by means of the pressure connectors 34, 35 such a pressure difference can be applied that individual ones or all of the sealing heads 5 in accordance with the illustration of FIG. 1 are lifted relative to the prepared operating position illustrated in FIG. 4 upwardly away from the stops into a maintenance position and from there, as needed, can also be moved downwardly again into the operating position resting on the stop.

Figure 5:
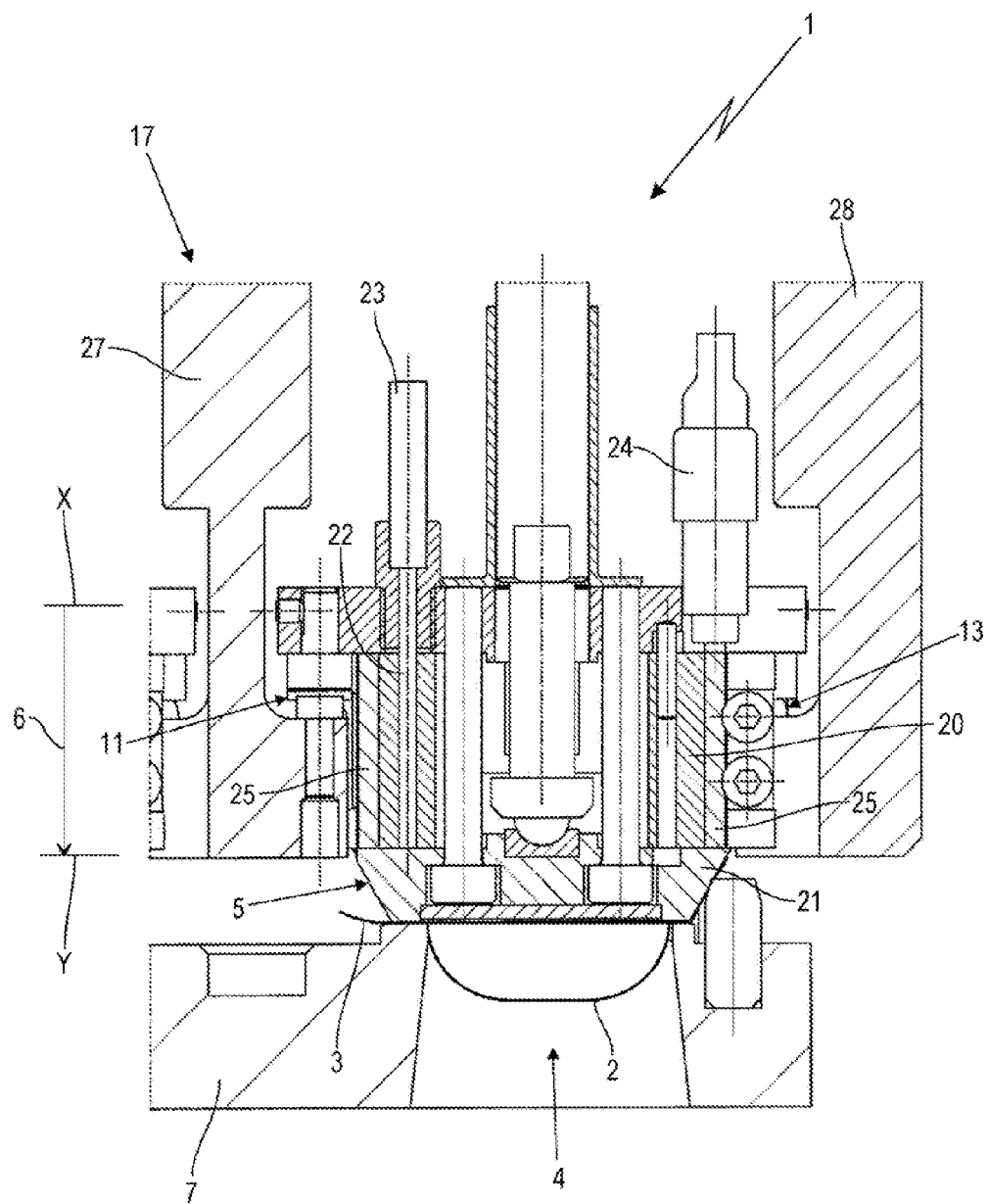
FIG. 5 shows in an enlarged detail illustration the arrangement according to FIG. 4 with a sealing head lowered into a contact position at the time of impacting the container bowl to be sealed.

FIG. 5 shows an enlarged detail view of the sealing device 1 according to FIG. 4 in the area of an individual sealing head 5. Here, the frame 17 including the spring support 14 (FIG. 4) is lowered from the starting position X illustrated in FIG. 4 in the vertical sealing stroke direction 6 downwardly relative to the stationary container receptacle 4 into a contact position Y. In this contact position Y, the sealing head 5 is resting with its sealing plate 21 with interposition of the heat sealing film 3 and the sealing rim of the container bowl 2 on the receiving block 7 or the rim of the container receptacle 4. Also, the sealing head 5 is still forced by the spring tension of the spring elements 8 (FIG. 4) against the contact points 11, 12 and the contact point 13, not visible here but illustrated in FIGS. 2 and 3, with formation of a stop at the securing plates 26, 27, 28 so that the sealing head 5 is precisely aligned relative to the securing plates 26, 27, 28 and the receiving block 7 or the container receptacles 4. In comparison to the starting position X, the relative position of the sealing heads 5 to the frame 17 or the spring support 14 (FIG. 4) has not changed. Despite the lifting movement, that is drivingly generated by the pneumatic cylinder 18 (FIG. 1), carried out by the frame 17, the spring support 14 (FIG. 4), and the sealing heads 5, the spring elements 8 or the pneumatic cylinders 37 (FIG. 4) remain passive and have no actively driven stroke movement.

By thickness tolerances and position tolerances in particular of the container bowls 2, it is not yet ensured in this state that the sealing head 5 with its sealing plate 21 will contact flat with uniform circumferential contact pressure the heat sealing film 3 and the sealing rim of the container bowl 2. This is realized then in the further method step according to FIG. 6.

Moreover, FIG. 5 shows various constructive details for designing the sealing head 5. It can be seen that the base member 20 of the sealing head 5 is of a multi-part configuration with a central part and an upper cover plate. However, a deviating configuration, for example, a single-part configuration, may be expedient. The sealing plate 21 is screwed on from below to the base member 20 in that fastening screws are guided from below through the sealing plate 21 and the central part of the base member 20 and screwed into inner threads of the upper cover plate of the base member 20. The temperature sensor 22 is passed from above through the base member 20 and rests with its lower end flat on the topside of the sealing plate 21. In this way, the temperature of the sealing plate 21 can be determined on the topside which is facing away from the container bowl 2. The base member 20 is provided in addition with a circumferential heating jacket 25 that is supplied by means of the heating connector 24 with electrical energy and heated. On the exterior side of the heating jacket 25 there is an insulation jacket, not identified. By means of the heating jacket 25 the base member 20 is heated and, in turn, releases its heat to the sealing plate 21 for reaching the required heat sealing temperature. The actually achieved temperature at the sealing plate 21 is determined by means of the temperature sensor 22 so that a temperature control and in particular control circuit for temperature regulation is provided.

Figure 6:
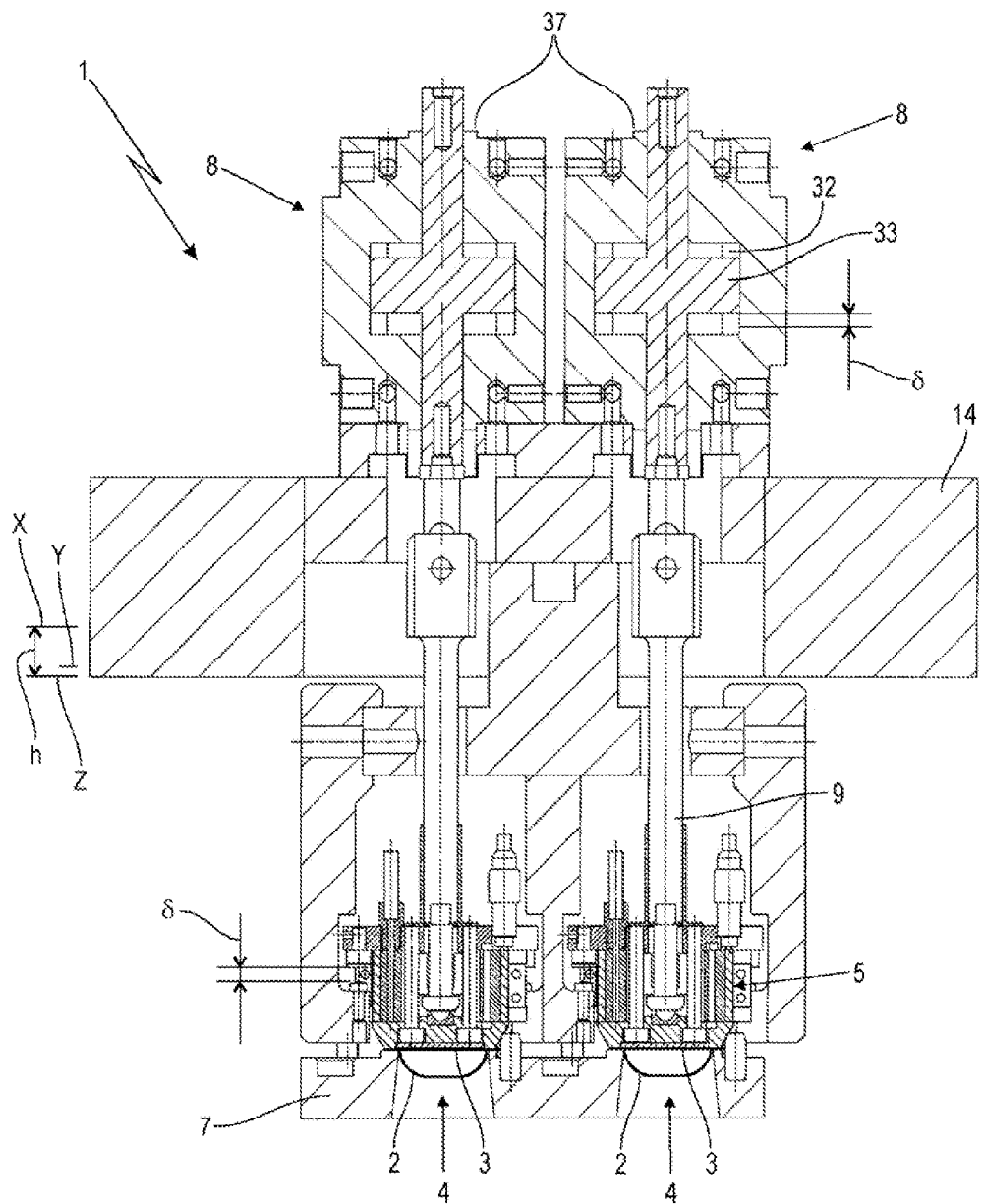
FIG. 6 shows the arrangement according to FIGS. 4 and 5 in a state farther lowered into a sealing position with sealing heads lifted off their stops.

FIG. 6 shows the sealing device 1 according to FIGS. 4 and 5 wherein the spring support 14 together with the spring elements 8 is lowered relative to the contact position Y according to FIG. 5 father downwardly to a sealing position Z. Beginning with the starting position X, the unit of spring support 14 and spring elements 8 as a whole is lowered by means of a central lower pneumatic cylinder 18 by a sealing stroke h in the sealing stroke direction 6 relative to the stationary container receptacles 4 or the stationary receiving block 7.

Since however the sealing heads 5, already in the contact position Y according to FIG. 5 with interposition of the heat sealing film 3 and the container bowls 2, are impacting on the correlated container receptacle 4, they cannot follow the lowering movement from the contact position Y to the sealing position Z. Instead, they are resting on the sealing rims of the container bowls 2 with interposition of the heat sealing film 3 and remain thereat stationarily. As a result, the lowering movement of the unit of spring support 14 and spring elements 8 from the contact position Y (FIG. 5) to the sealing position Z (FIG. 6) serves to lift all individual sealing heads 5 from their stops by an individual lifting stroke δ.

This movement by the lifting stroke δ is not caused by the passive pneumatic cylinders 37 acting as spring elements 8 but, in accordance with the above functional description, by the central lower pneumatic cylinder 18. The individual lifting strokes δ differ with respect to their value by the thickness tolerances and position tolerances of the individual container bowls 2 or their sealing rims. By the same amount of individual lifting stroke δ, the individual pistons 33 in their cylinders 32 of the pneumatic cylinders 37 are forced upwardly against the acting gas pressure difference and the pretension that is resulting therefrom. Since the respective lifting stroke δ in comparison to the possible total stroke of the pneumatic cylinders 37 is small, in case of an optionally closed embodiment of gas pressure springs, or the pneumatic cylinders 37 acting as such, the pressure difference adjusted beforehand and thus the spring pretension across the lifting stroke δ remains at least approximately constant; if at all, it increases minimally. The same holds true also for an embodiment of the spring elements 8 as coil pressure springs or the like.

By means of the optional pressure storage 39 and the resulting volume enlargement, possible pressure fluctuations are further reduced. In case of the preferred pressure regulation that is used herein, the afore described pressure difference and thus the pressure pretension remain entirely independent of the respective lifting stroke δ and also of other external influences. In any case, in the sealing position Z a defined pressure difference and thus a certain fixedly defined pretension are adjusted that is transmitted vertically downwardly by means of the pressure rod 9 onto the respective sealing head 5. Since the sealing heads 5 in the sealing position Z are no longer resting on their stops but are lifted off, the aforementioned pretension of the spring elements 8 or of the pneumatic cylinders 37 creates a fixedly defined sealing pressure by means of which the respective sealing head 5 seals the heat sealing film 3 onto the sealing rim of the correlated container bowl 2.

Since all sealing heads 5 are lifted off their stops or, in reverse, the unit of spring support 14 and spring elements 8 has been moved downwardly by the lifting stroke δ relative to the sealing heads 5 and therefore the stops are no longer effective, a compensation of height tolerances and position tolerances of the individual container bowls 2 is adjusted automatically such that each individual container bowl 2 and its associated section of the sealing film 3, independent of the aforementioned tolerances, are subjected to a certain sealing contact pressure defined by the spring pretension of the individual spring elements 8 even when in operation position tolerances and/or thickness tolerances and/or other tolerances of the container bowls 2 or their sealing rims are present. Since also the afore described contact points 11, 12, 13 are no longer effective and the individual sealing heads by means of the articulations 29, 30 (FIG. 4) are tiltable about at least one, preferably several axes that are perpendicular to the sealing stroke direction 6, in addition to height tolerances also position tolerances in the tilting direction can be compensated such that the respective sealing head 5 with its planar sealing surface will rest flat and uniformly on the respective sealing rim of the container bowl 2 with intermediately positioned sealing film 3.

From the above explanations it is in particular apparent that the tolerance compensation in accordance with the invention is not to be understood as elimination of existing tolerances of any kind by excessive pressure application or excessive melting of the sealing rims. Instead, the aforementioned tolerances remain unchanged and are only taken into account in the meaning of the tolerance compensation according to the invention by the yielding action of the sealing heads 5 in such a way that despite the existing tolerances a uniform, reproducible, and reliable sealing action is realized.

The specification incorporates by reference the entire disclosure of European priority document 12 002 095.3 having a filing date of 26 Mar. 2012.

While specific embodiments of the invention have been shown and described in detail to illustrate the inventive principles, it will be understood that the invention may be embodied otherwise without departing from such principles.

What is claimed is:

1. A sealing device for sealing container bowls with a heat sealing film, the sealing device comprising:
   several container receptacles for simultaneous receiving of several container bowls, wherein the container receptacles are fixedly connected to each other;
   several sealing heads each associated with one of the container receptacles, wherein the sealing heads for simultaneous sealing of a heat sealing film in a sealing process onto the container bowls are movable in a sealing stroke direction relative to the container receptacles;
   a common spring support, wherein several spring elements are secured on the common spring support and act on the sealing heads;
   wherein the sealing heads in a rest position are forced with pretension by the spring elements in the sealing stroke direction against a stop, each sealing head having one stop and one spring element associated therewith;
   wherein a total of three contact points are provided for forming the stop;
   wherein a travel stroke of the common spring support with a sealing stroke in the sealing stroke direction is provided with such a value that upon impacting of the sealing heads on the container receptacles correlated therewith, with interposition of the container bowls and the heat sealing film, the sealing heads are lifted off their stops against the pretension.

2. The sealing device according to claim 1, wherein the several container receptacles are combined to form a common receiving block.

3. The sealing device according to claim 1, wherein the sealing heads each are connected to the spring element correlated therewith so that the sealing heads each are tiltable about at least one axis that is perpendicular to the sealing stroke direction.

4. The sealing device according to claim 3, wherein the sealing heads each are connected with articulation to a pressure rod and the pressure rod is connected with articulation to the spring element.

5. The sealing device according to claim 1, wherein the sealing heads each are connected to one of the spring elements correlated therewith, respectively, so that the sealing heads each are tiltable about several axes that are perpendicular to the sealing stroke direction.

6. The sealing device according to claim 1, wherein the first contact point is formed by two planar surfaces that meet each other, the second contact point is formed by a roof-shaped notch and an appropriate counter member, and the third contact point is formed by a recess, provided with a circumferentially extending rim, and an appropriate counter member.

7. The sealing device according to claim 6, wherein the recess is a conical recess.

8. The sealing device according to claim 1, wherein the spring elements are formed by gas pressure spring.

9. The sealing device according to claim 8, wherein the gas pressure spring is a pneumatic cylinder wherein the pneumatic cylinder during the sealing process is loaded with a predetermined pressure difference.

10. The sealing device according to claim 9, wherein the pneumatic cylinder is provided with a pressure control valve for obtaining the predetermined pressure difference.

11. The sealing device according to claim 9, wherein the pneumatic cylinder, for maintaining the predetermined pressure difference, is connected with a pressure storage.

12. The sealing device according to claim 9, wherein the pneumatic cylinder, apart from the sealing process, is controllable as a lifting cylinder.

13. The sealing device according to claim 1, further comprising a stationarily secured baseplate, wherein the container receptacles fixedly connected to each other are stationarily positioned during the sealing process on the baseplate, wherein the spring support is positioned above the baseplate, wherein the spring support with the several spring elements secured thereon and the correlated sealing heads is movable from an upper starting position in downward direction toward the baseplate and toward the container receptacles in the sealing stroke direction.

14. The sealing device according to claim 13, wherein the container receptacles are combined to form a common receiving block and the common receiving block is stationarily positioned on the stationarily secured baseplate during the sealing process.

15. The sealing device according to claim 14, further comprising a bottom support arranged underneath the baseplate and at least two columns, wherein the spring support arranged above the baseplate, the bottom support, and the a least two columns form together a closed frame that is lowered in the sealing stroke direction in downward direction from the upper starting position relative to the baseplate with the container receptacles.

16. The sealing device according to claim 15, further comprising an actuator arranged between the bottom support and the baseplate, wherein the actuator causes the closed frame to be lowered in the sealing stroke direction and lifted in opposite direction.

17. The sealing device according to claim 16, wherein the actuator is a pneumatic cylinder.

18. The sealing device according to claim 1, wherein the sealing heads each comprise a base member and a sealing plate that is releasably and exchangeably secured on the base member, wherein the sealing heads each further comprises a heating jacket and a temperature sensor mounted on the base member.

19. A method for sealing container bowls with a sealing film by means of a sealing device according to claim 1, the method comprising:
   simultaneously placing several container bowls into several container receptacles that are fixedly connected to each other;
   forcing several individual sealing heads, each correlated with one of the container receptacles, into a rest position against a stop with pretension created by a spring element, respectively, in a sealing stroke direction, wherein each one of the sealing heads has one stop associated therewith and wherein a total of three contact points are provided for forming the stop;
   for a simultaneous sealing action of a heat sealing film onto the container bowls, moving a common spring support, on which the spring elements are jointly secured, together with the spring elements and the sealing heads in the sealing stroke direction relative to the container receptacles to such an extent that the sealing heads upon impacting on the container receptacles correlated therewith, with interposition of the container bowls and the heat sealing film, are lifted off the three contact points of the stops, respectively, against the pretension.

* * * * *